United States Patent
Zou et al.

(10) Patent No.: US 8,755,140 B1
(45) Date of Patent: *Jun. 17, 2014

(54) WRITE CLOCK REPHASE FOR MAGNETIC RECORDING DEVICE

(71) Applicant: Marvell International Ltd., Hamilton (BM)

(72) Inventors: Qiyue Zou, San Jose, CA (US); Supaket Katchmart, San Jose, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,849

(22) Filed: Aug. 9, 2013

Related U.S. Application Data

(63) Continuation of application No. 12/949,693, filed on Nov. 18, 2010, now Pat. No. 8,508,879.

(60) Provisional application No. 61/297,228, filed on Jan. 21, 2010, provisional application No. 61/303,221, filed on Feb. 10, 2010.

(51) Int. Cl.
*G11B 5/09* (2006.01)

(52) U.S. Cl.
USPC .................................................. 360/51

(58) Field of Classification Search
None
See application file for complete search history.

(56) References Cited

U.S. PATENT DOCUMENTS

| | | | |
|---|---|---|---|
| 5,535,067 A | 7/1996 | Rooke | |
| 5,706,260 A | 1/1998 | Kishi et al. | |
| 5,905,705 A | 5/1999 | Takeda et al. | |
| 6,222,692 B1 | 4/2001 | Shrinkle | |
| 6,529,456 B2 | 3/2003 | Koudo et al. | |
| 6,643,082 B1 | 11/2003 | Belser | |
| 7,088,534 B2 | 8/2006 | Sutardja | |
| 7,092,462 B2 | 8/2006 | Annampedu et al. | |
| 7,400,464 B1 | 7/2008 | Katchmart | |
| 8,331,050 B1 | 12/2012 | Zou et al. | |

(Continued)

FOREIGN PATENT DOCUMENTS

EP 56236 B1 5/1986

OTHER PUBLICATIONS

"Density Multiplication and Improved Lithography by Directed Block Copolymer Assembly for Patterned Media at 1Tbit/ in2 and Beyond"; Aug. 2008; pp. 1-3; Hitachi Global Storage Technologies; San Jose, CA., 3 pages.

(Continued)

*Primary Examiner* — Regina N Holder

(57) ABSTRACT

Synchronization technologies for disk drives are described. A described technique includes producing signals that include processing a waveform produced by a read head operated with respect to a recording medium including magnetic data positions arranged on tracks including first and second tracks; producing, based on the waveform, a servo detect pulse that indicates a detection of servo data on the first track; measuring a timing difference that is based on the servo detect pulse and a write pulse of a write clock signal; controlling an adjustment of a phase of the write clock signal based on the timing difference to align the write clock signal with at least a portion of the data positions; and controlling a write head to write to one or more data positions of the second track based on the write clock signal while a servo clock signal is servo locked on the first track.

20 Claims, 11 Drawing Sheets

(56) References Cited

U.S. PATENT DOCUMENTS

| | | |
|---|---|---|
| 8,508,878 B1 * | 8/2013 | Zou et al. .................. 360/51 |
| 8,508,879 B1 * | 8/2013 | Zou et al. .................. 360/51 |
| 2004/0047252 A1 | 3/2004 | Miyatake et al. |
| 2006/0132953 A1 | 6/2006 | Asakura et al. |
| 2009/0237829 A1 | 9/2009 | Ozawa et al. |
| 2010/0053814 A1 | 3/2010 | Shibano |
| 2010/0073801 A1 | 3/2010 | Itakura |
| 2010/0118426 A1 | 5/2010 | Vikramaditya et al. |
| 2010/0123973 A1 | 5/2010 | Ozawa et al. |
| 2010/0142078 A1 | 6/2010 | Annampedu et al. |
| 2010/0202079 A1 | 8/2010 | Buch et al. |
| 2010/0220409 A1 | 9/2010 | Shibano |
| 2010/0246048 A1 | 9/2010 | Ranmuthu |

OTHER PUBLICATIONS

Qiyue Zou, "Sensor-Aided Patterned Magnetic Media Synchronization Systems", U.S. Appl. No. 13/007,787, filed Jan. 17, 2011, 54 pages.

* cited by examiner ly controlled with respect to the rotating disk. A closed-loop control system can respond to servo information embedded in dedicated portions of a track on the recording surface to accurately position the head and synchronize the timing of drive operations.

WRITE CLOCK REPHASE FOR MAGNETIC RECORDING DEVICE

CROSS REFERENCE TO RELATED APPLICATIONS

This disclosure is a continuation application of and claims the benefit of the priority of U.S. patent application Ser. No. 12/949,693, filed Nov. 18, 2010 and entitled "Write Clock Rephase For Magnetic Recording Device" (now U.S. Pat. No. 8,508,879), which claims the benefit of the priority of (i) U.S. Provisional Application Ser. No. 61/297,228, filed Jan. 21, 2010 and entitled "Phase Synchronization for Write Clock," and (ii) U.S. Provisional Application Ser. No. 61/303,221, filed Feb. 10, 2010 and entitled "Write Clock Rephase for BPM." The disclosures of the above applications are incorporated herein by reference in their entirety.

BACKGROUND

Storage devices, such as a magnetic medium based disk drive, can store data on circular, concentric tracks on a disk surface. A magnetic medium based disk drive can include one or more bit-patterned media (BPM) based disks. BPM based disks have separately defined bit positions. In some implementations, a BPM based disk includes an ordered array of uniform magnetic islands where each bit occupies a single magnetic island.

A disk drive uses one or more clock signals for drive operations such as read and write operations. A drive head, in the disk drive, retrieves and records data on a rotating disk as the head flies on a cushion of air over the disk surface. When retrieving data, magnetic field variations are converted into an analog electrical signal, the analog signal is amplified, converted to a digital signal, and interpreted. A drive head can include a read head and a write head.

To guarantee the quality of the information saved on and read back from the disk, the drive head should be accurately positioned at the center of the track during both writing and reading, and the speed or frequency of read and write should be accurately controlled with respect to the rotating disk. A closed-loop control system can respond to servo information embedded in dedicated portions of a track on the recording surface to accurately position the head and synchronize the timing of drive operations.

SUMMARY

The present disclosure includes systems and techniques for operating a recording device, such as a disk drive.

According to an aspect of the present disclosure, a method for operating a recording device includes producing signals that include a write clock signal and a servo clock signal, processing a waveform produced by a read head operated with respect to a recording medium, which includes magnetic bit cells arranged on tracks, and the servo clock signal. The technique includes producing, based on the waveform, a servo detect pulse that indicates a detection of servo data, measuring a timing difference that is based on the servo detect pulse and a write pulse of the write clock signal, and controlling an adjustment of a phase of the write clock signal based on the timing difference to align the write clock signal with at least a portion of the bit cells.

Implementations based on the method can include one or more of the following features. Implementations can include operating a counter to count clock pulses of the write clock signal. Implementations can include producing a write clock sync pulse based on N increments of the counter, where N represents a number of bit cells in an area defined by a distance, on a track of the medium, from a first servo sync mark to a second servo sync mark. Measuring the timing difference can be responsive to the write clock sync pulse. Implementations can include determining timestamps in response to the write clock sync pulse and the servo detect pulse. A timestamp can include a timestamp of the servo detect pulse and a timestamp of the write pulse. Measuring the timing difference can include calculating a difference based on the determined timestamps. Controlling the adjustment of the phase of the write clock signal can include providing a control signal to a phase interpolator. The control signal can be responsive to the adjustment. Implementations can include controlling a write head to write to one or more bit cells of a first track of the tracks based on the write clock signal. The servo clock signal can be servo locked on a second track of the tracks. Implementations can include preventing the write head from writing to the one or more bit cells when the timing difference exceeds a threshold.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include clock circuitry configured to produce a write clock signal and a servo clock signal; circuitry configured to process a waveform produced by a read head operated with respect to a recording medium (e.g., a medium that includes magnetic bit cells arranged on tracks); circuitry configured to produce, based on the waveform, a servo detect pulse that indicates a detection of servo data; circuitry configured to measure a timing difference that is based on the servo detect pulse and a write pulse of the write clock signal; and circuitry configured to control an adjustment of a phase of the write clock signal based on the timing difference to align the write clock signal with at least a portion of the bit cells.

These and other implementations can include one or more of the following features. Implementations can include circuitry configured to operate a counter to count clock pulses of the write clock signal; and circuitry configured to produce a write clock sync pulse based on N increments of the counter, where N represents a number of bit cells in an area defined by a distance, on a track of the medium, from a first servo sync mark to a second servo sync mark. Circuitry configured to measure the timing difference can be responsive to the write clock sync pulse. Implementations can include circuitry configured to determine timestamps in response to the write clock sync pulse and the servo detect pulse. The timestamps can include a timestamp of the servo detect pulse and a timestamp of the write pulse. Circuitry configured to measure the timing difference can be responsive to the determined timestamps. Implementations can include a first phase-locked-loop circuit to produce a servo clock signal; a second phase-locked-loop circuit to produce the write clock signal; and a phase interpolator to adjust the phase of the write clock signal. Clock circuitry can be configured to use a single voltage controlled oscillator to produce the write clock signal and a servo clock signal. The clock circuitry can include a phase-locked-loop circuit, that includes the voltage controlled oscillator, to produce a source clock signal; and a frequency divider to produce a frequency adjusted version of the source clock signal. Implementations can include circuitry configured to produce a servo clock signal; circuitry configured to control a write head to write to one or more bit cells of a first track of the tracks based on the write clock signal. The servo clock signal can be servo locked on a second track of the tracks. Implementations can include circuitry to prevent the write head from writing to the one or more bit cells when the timing difference exceeds a threshold.

In another aspect, systems and apparatuses can include a recording medium; clock circuitry configured to produce a write clock signal and a servo clock signal; a read head, operated with respect to the medium and the servo clock signal, to produce a waveform; a servo detector configured to produce, based on the waveform, a servo detect pulse that indicates a detection of servo data; a timestamp circuit configured to measure a timing difference that is based on the servo detect pulse and a write pulse of the write clock signal; a control loop calculator configured to control an adjustment of a phase of the write clock signal based on the timing difference to align the write clock signal with at least a portion of the bit cells; and a write head, operated with respect to the medium and the write clock signal, to write data to the at least the portion of the bit cells.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
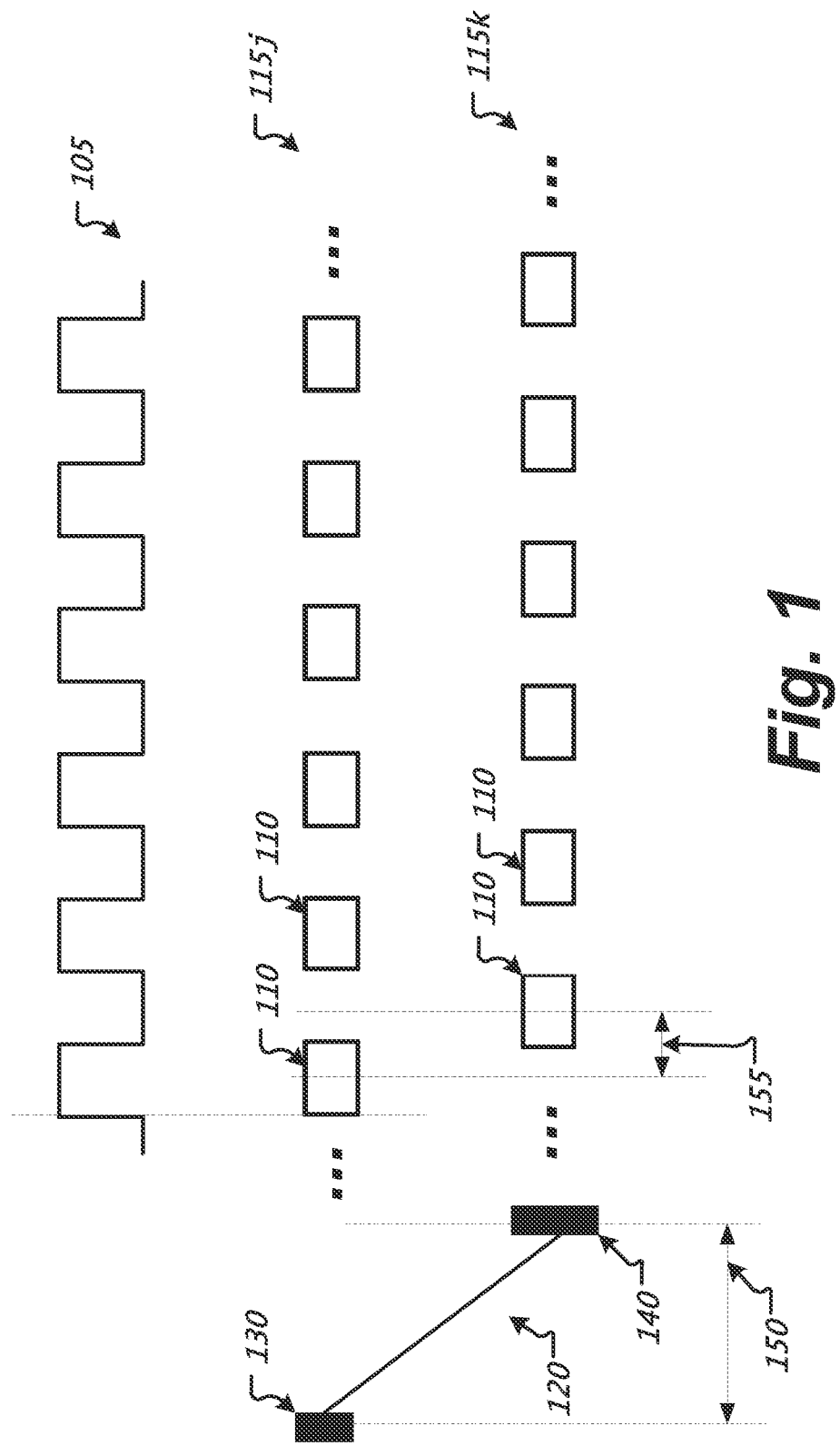
FIG. 1 shows an example of an alignment of clock signal pulses with bit cells on a bit-patterned medium.

Bit-patterned media (BPM) technologies can increase the capacity of magnetic storage to beyond 1 Tbit/in$^2$. In today's conventional continuous media, for example, recorded bits are composed of many independent nanometer-scale grains in a film of magnetic alloy. Increasing bit density for greater storage capacity may require increasingly smaller grain sizes. However, smaller grain sizes on a continuous media may increase superparamagnetic effects to the point where the effects become a major factor that prevents further increases of storage density.

In contrast to continuous media, BPM based disks have separately defined bit positions. For example, such disks can include an ordered array of uniform magnetic islands where each bit occupies a single magnetic island. Such a bit arrangement may achieve better thermal stability than continuous media. Because the position of each bit is predefined by the media, BPM technology may require greater write clock frequency and phase accuracy than continuous media. For example, loss in synchronization between the write clock pulses and the bit islands may cause significant errors that are difficult to detect and correct.

During operation, a disk drive may experience deterministic disturbances, non-deterministic disturbances, or both that impact drive synchronization. Deterministic disturbances such as repeatable run-out (RRO) errors and non-deterministic disturbances such as non-repeatable run-out (NRRO) errors can cause clock synchronization errors. Various examples of deterministic disturbances include disk eccentricity, servo RRO errors, and spindle commutation harmonics, e.g., harmonics of a spindle frequency. Sources of non-deterministic disturbances include phase noise and transient events such as a physical tap on a drive and fluctuations in power that alter a rate of rotation. In some cases, RRO errors are a dominate source of write clock timing errors. RRO errors typically cause the same timing error pattern each time a drive head passes over the same portion of the track, whereas, NRRO errors are generally random and causes different error patterns for the same portion of the track.

The subject matter described herein includes details and implementations of write clock synchronization technologies for various recording media. Write clock synchronization technologies include a write clock synchronization technique to operate disk drives that employ high performance timing control for writing operations, such as BPM based disk drives. For example, a write clock synchronization technique includes sensing a bit pattern of a BPM disk to synchronize a write clock to write data to a region of the disk. The technique can be repeated to rephase the write clock to write to a different region of the disk. Potential advantages of the disk drive synchronization technologies include compensating for errors, such as deterministic disturbances, non-deterministic disturbances, or both, in an optimized manner to provide accurate synchronization for write operations.

FIG. 1 shows an example of an alignment of clock signal pulses with bit cells on a bit-patterned medium. A disk drive system can use a write clock signal 105 to control a write operation on a BPM disk. A BPM disk includes multiple bit islands called bit cells 110 that are arranged on two or more tracks 115$j$, 115$k$. For example, a bit-patterned medium can have an arrangement of bits cells 110 that forms concentric tracks about a center of the medium. The disk drive system can include a head structure 120 that is positioned by a servo.

The head structure 120 includes a write head 130 and a read head 140. In this example, the write head 130 and the read head 140 are physically offset such that the read head 140 reads data such as servo information on a first track 115k and the write head 130 writes data to a second track 115j. Reading servo information can include reading a portion of a servo wedge.

The write clock signal 105 is synchronized based on servo information detected on a first track 115k via the read head 140 before writing data to a second track 115j. Based on the detected servo information, disk geometry, and head structure geometry, the disk drive system can adjust the write clock signal 105 such that a rising edge of a write clock pulse aligns with an edge of a bit cell 110 on track 115k. Various examples of disk geometry and head structure geometry information include a head offset value 150 and an inter-track phase offset value 155. A head offset value 150 is based on a distance between a read head and a write head. An inter-track phase offset value 155 represents a difference in phase between the first track 115k and the second track 115j.

In some implementations, a disk drive system, in performing a clock synchronization, can process a waveform produced by a read head operated with respect to a BPM disk to sense bit patterns on the disk. The timing information provided by the waveform can be used to synchronize a write clock 105 with the disk. For example, a phase-locked loop can be used to synchronize a write clock 105 based on the read head signal. The disk drive system can set a phase shift for the write clock 105 via a phase interpolator. The phase shift can be determined through a calibration process for one or more tracks 115j, 115k. Once synchronized, the write clock 105 becomes in phase with one or more bit cells 110.

Figure 2:
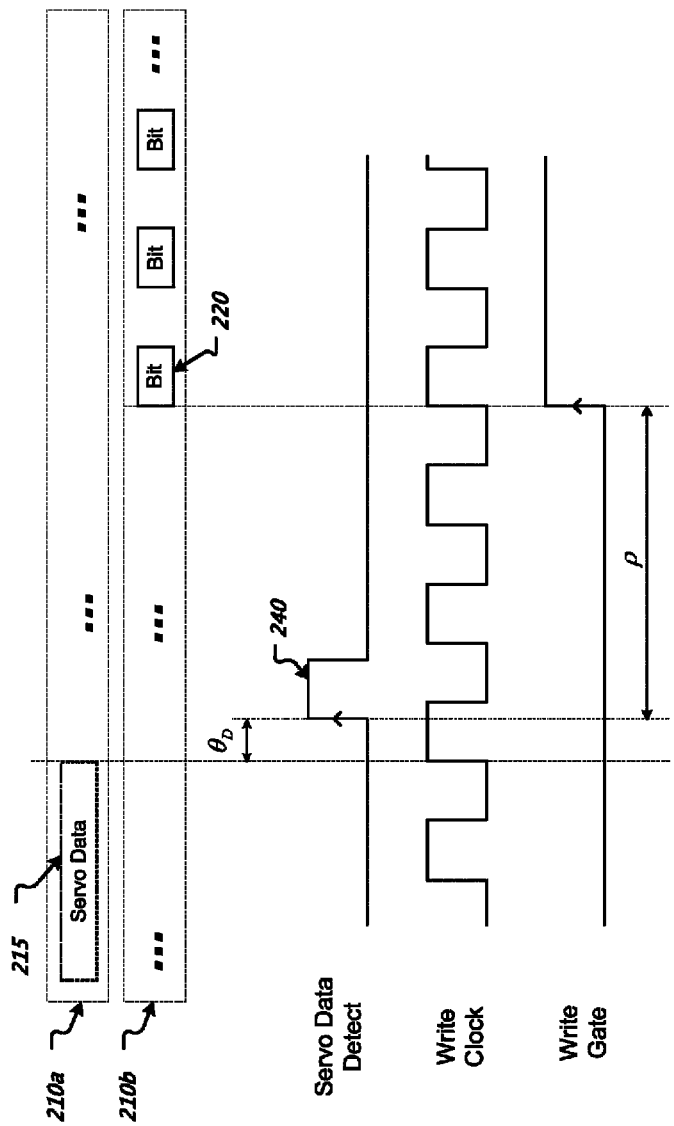
FIG. 2 shows an example of write timing synchronization with respect to bit cells of a bit-patterned medium.

FIG. 2 shows an example of write timing synchronization with respect to bit cells of a bit-patterned medium. A disk drive system, which can include a servo controller, can synchronize the timing of writes to bits cells of a BPM based disk. The servo controller reads servo data 215 on a track 210a of a BPM disk via a read head. To indicate the detection of a servo synchronization mark in servo data 215, a servo demodulator produces a detection pulse 240 (e.g., a sync mark found pulse) on a servo data detect line. Timestamp circuitry generates a timestamp of the detection pulse 240 with respect to the write clock. Based on the generated timestamp, the controller performs a synchronization process for related control signals such as adjusting a phase of a write clock, write gate timing, or both.

After performing a synchronization based on the detection of servo data 215, the controller can perform a write operation on one or more bit cells 220 of a target track 210b. Writing to the target track 210b can commence based on signaling of a write gate line. Performing a synchronization can include determining when to generate a signal on the write gate line with respect to the detection pulse 240. Writes to individual bit cells 220 of the target track 210b are aligned with respective pulses on a write clock line. The controller can perform additional synchronizations to write to other groups of bit cells located at different data wedges of the target track 210b based on respective detections of additional servo sync marks on a different track 210a.

Performing synchronization can include adjusting a phase of a write clock based on information including a write phase offset $\rho$, conveying the phase offset based on the rising edge of a detection pulse 240 and the rising edge of a write clock for a data bit 220 following a servo wedge. The write phase offset can be fractional. The write phase offset can be calibrated by a controller during a drive manufacturing process and stored on chip memory. The write phase offset can be measured in clock cycles.

Determining a write phase offset can include using an initial offset, writing a predetermined sequence to a track based on the initial offset, determining an error value based on a read-back version of the sequence, and adjusting the initial offset if required. In some implementations, determining a write phase offset includes iterating through multiple offset values, writing a predetermined sequence to a track based on an offset value of a given iteration, reading back information, and recording a corresponding bit error rate (BER). Determining a write phase offset can include selecting an offset value that corresponds to the lowest recorded BER. In some cases, a band of write phase offset values exist that result in minimum BER, and one of the values cane be selected.

A phase delay value $\theta_D$ indicates a phase offset based on the rising edge of the detection pulse 240 and the rising edge of a write clock pulse. In some implementations, a phase delay value is computed by timestamp circuitry based on a predetermined resolution. The value of $\theta_D$ can be zero if a servo clock is the same as a write clock. However, the servo clock and the write clock can be asynchronous. Based on $\theta_D$ and $\rho$, a disk drive can adjust the phase of the write clock to synchronize the write clock with the media.

Figure 3:
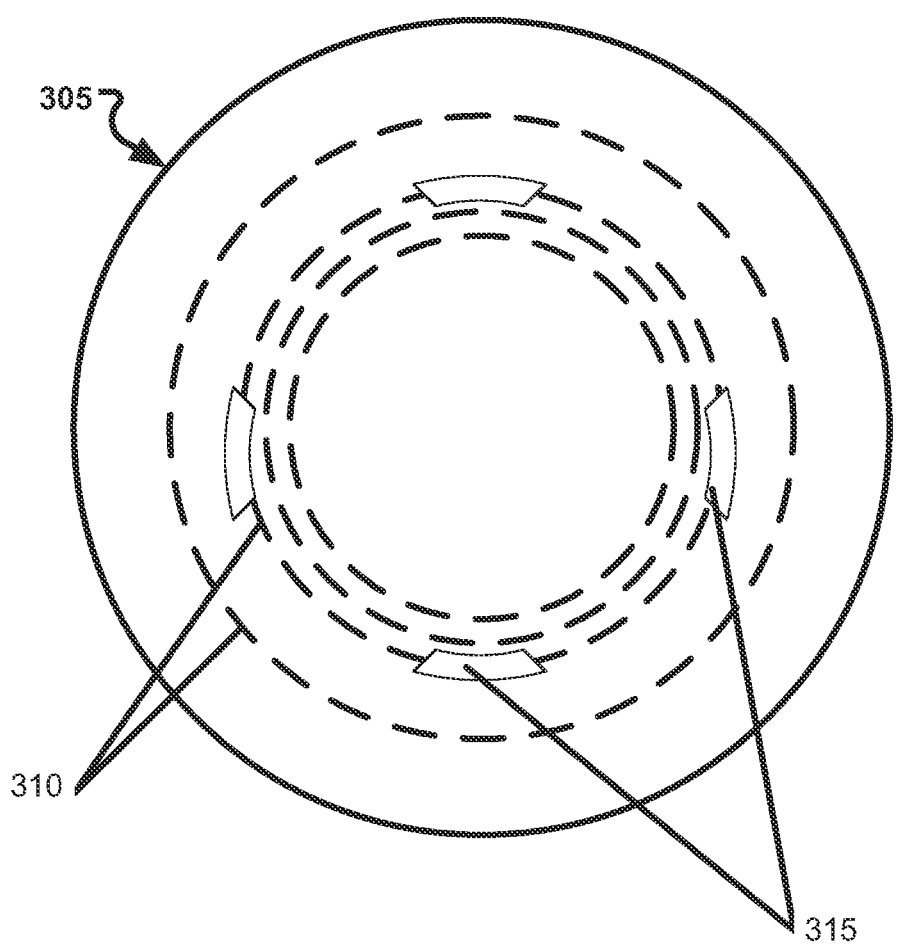
FIG. 3 shows an example of a surface of a recording medium that includes servo wedges.

FIG. 3 shows an example of a surface of a recording medium that includes servo wedges. A recording medium 305 includes multiple data tracks 310 and servo wedges 315. A servo wedge 315 includes servo data designed to provide accurate read/write head positioning with respect to data tracks. For sake of brevity and simplicity, FIG. 3 only shows four servo wedges 315 on one data track 310. However, a recording medium 305 can include significantly more servo wedges 315 (e.g., hundreds of servo wedges) on multiple data tracks 310.

The data tracks 310 are concentrically located areas defining tracks associated with different radii on a surface of the recording medium 305. In some implementations, data tracks 310 are divided into multiple data sectors and formatted in radial zones. A data track 310 can include bit cells between servo wedges 315. In some implementations, the bit cells are fabricated by a lithographic manufacturing process.

Servo wedges 315 can be equally spaced about a circumference of the surface of the recording medium 305. A servo wedge 315 can include servo patterns written thereon. For example, each servo wedge 315 can include data and supporting bit patterns that can be used for control and synchronization of a drive head over a desired storage location on a recording medium 305. A servo wedge 315 can include information such as a servo wedge index and a track number. A disk control system can use the servo wedges 315 to control a rotational speed of the recording medium 305.

In some implementations, at least a portion of a servo wedge 315 is etched on a surface of the recording medium 305. In some implementations, a servo wedge 315 includes one or more strips of magnetic material that extend radially from the inner diameter (ID) to the outer diameter (OD) of the recording medium 305. For example, a servo wedge 315 can span two or more data tracks 310. In some implementations, a servo wedge 315 includes islands of magnetic material in an arrangement useful for servo control. For example, a portion of a servo wedge 315 is encoded by one or more bit cells.

A servo pattern contained in a servo wedge 315 can be read by the drive head as the surface of the recording medium 305 passes under a drive head. Servo patterns written in the servo wedges 315 can provide a disk control system with head position control information to control an actuator arm when moving a drive head from starting tracks to destination tracks during random access track seeking operations. The servo patterns can provide a disk control system with head position control information to control an actuator arm when positioning and maintaining a drive head in proper alignment with a track during track following operations when data are read from or written to data sectors on the data tracks 310.

In some implementations, before performing a read/write operation on a section of a data track 310, a drive head can lock onto a desired track by referring to the positioning information retrieved using the servo patterns in a given servo wedge 315. The servo wedges 315 can provide the positioning information necessary to control a spindle motor rotating the recording medium 305 and to position a drive head to read and write data at the correct locations on the recording medium 305.

A servo wedge 315 can include a preamble, a servo sync mark (SSM) (e.g., used for locking a phase and frequency of a servo timing loop clock to a given servo pattern), and location information such as a track identification field and data block address (e.g., used for identifying a target track and data block). In some implementations, a SSM includes a Servo Index Mark (SIM), Servo Address Mark (SAM), or both.

Figure 4:
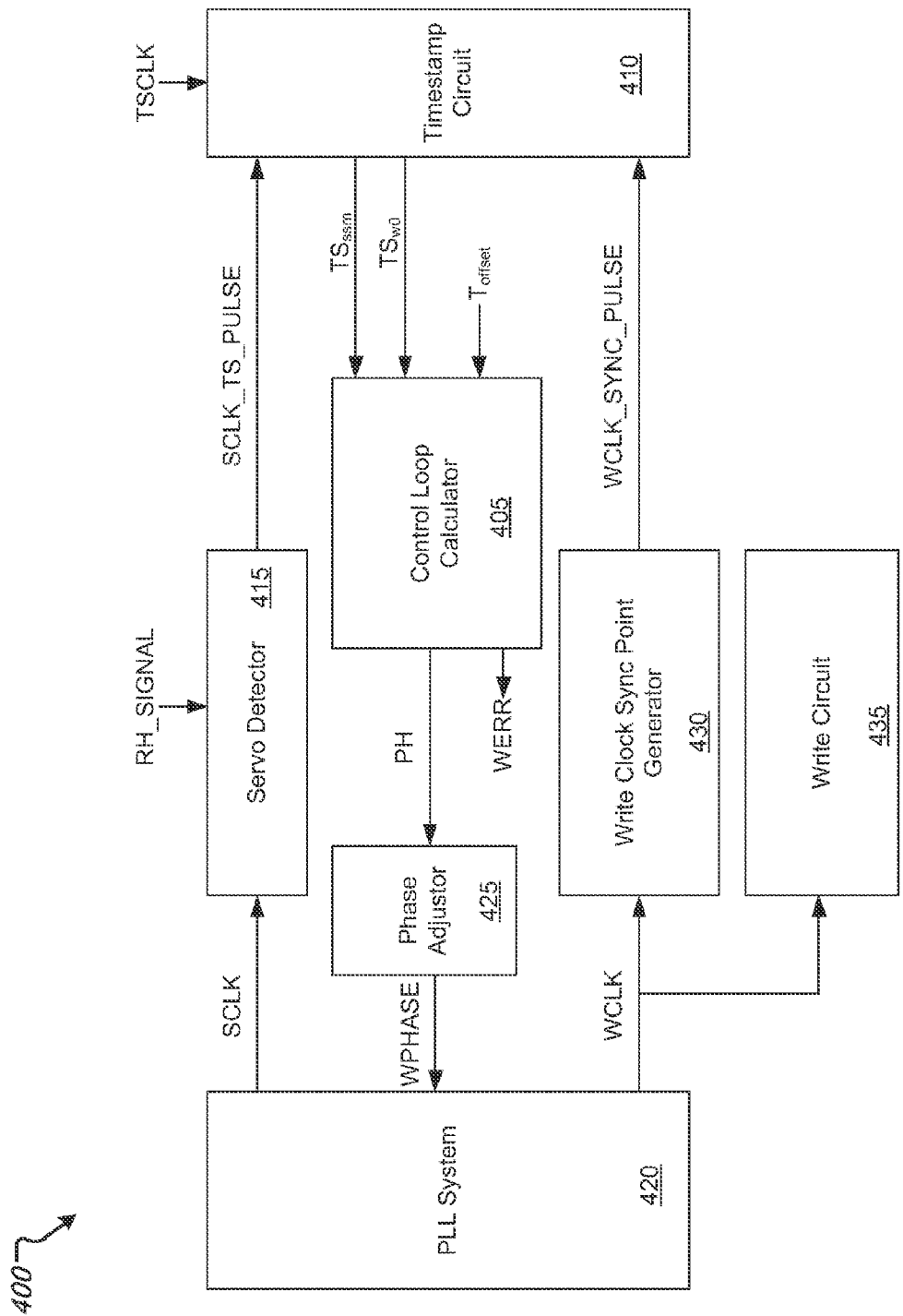
FIG. 4 shows an example of a write phase control system architecture.

FIG. 4 shows an example of a write phase control system architecture. A disk drive can include a write phase control system 400 for drive synchronization. The write phase control system 400 includes a control loop calculator 405 to adjust a phase of one or more clocks that are produced by a phase-locked-loop (PLL) system 420. The PLL system 420 can generate clock signals such as a servo clock (SCLK) and a write clock (WCLK). A write circuit 435 can use the write clock to write data to a BPM disk.

A servo detector 415 can generate a servo clock timestamp pulse (SCLK_TS_PULSE) based on a detection of servo information in a read head signal (RH_SIGNAL) with respect to the servo clock. A write clock sync point generator 430 can produce a write clock sync pulse (WCLK_SYNC_PULSE) based on a roll over of a counter incremented by pulses of the write clock.

A timestamp circuit 410 can provide timing values to the control loop calculator 405 based on signals including the servo clock timestamp pulse, the write clock sync pulse, and a timestamp clock (TSCLK). The control loop calculator 405 can determine phase values (PH) based on the timing values. Based on the one or more of determined phase value, a phase adjustor 425 can gradually change a write phase (WPHASE) input of the PLL system 420 to avoid sudden frequency shifts and glitches in a write clock. For example, a phase change can be distributed over two or more, smaller, phase changes in respective two or more clock cycles.

In some implementations, a PLL system 420 includes a servo interpolator and a data interpolator. A servo interpolator can be in communication with a servo detector 415. A data interpolator can be in communication with a write clock sync point generator 430 and a write circuit 435.

In some implementations, a PLL system 420 includes a single voltage-controlled oscillator (VCO) to drive the servo clock and the write clock. A servo clock and a write clock can have different frequency requirements. To produce signals with different frequency requirements, a PLL system 420 can include a frequency divider to divide the frequency of a signal generated by a single VCO to produce a frequency adjust version of the VCO output signal. In some implementations, a PLL system 420 includes first and second VCOs, in separate PLLs, to drive a servo clock and a write clock, respectively.

Figure 5A:
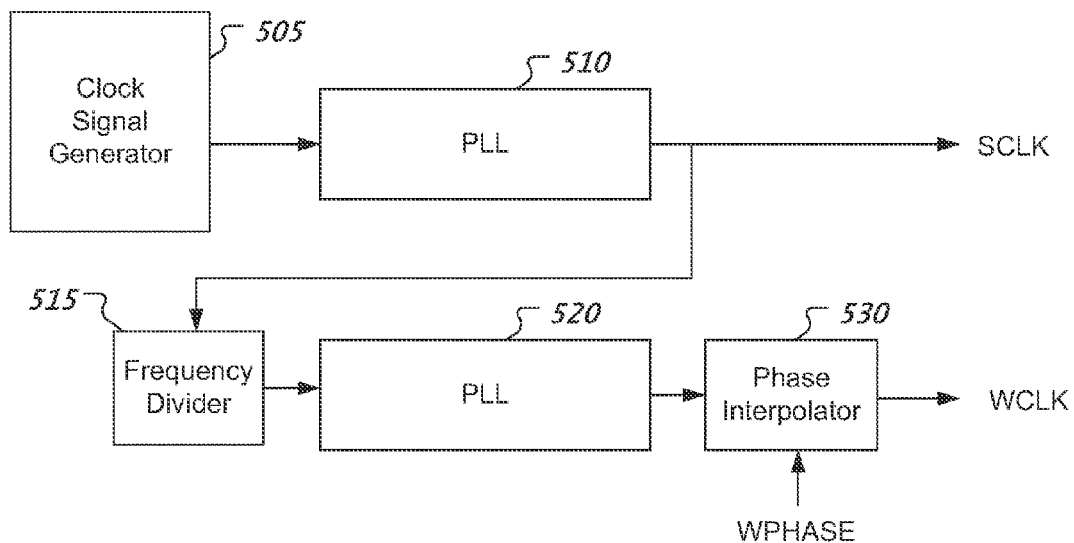
FIGS. 5A and 5B show different examples of a phase-locked-loop system.

FIG. 5A shows an example of a PLL system. A PLL system can use a PLL chain to generate a write clock from a read clock. The PLL system includes a clock signal generator 505, a first PLL 510, and a second PLL 520. The clock signal generator 505 can produce a signal with a frequency of $F_{osc}$. A first PLL 510 can use the signal to generate a servo clock. A frequency divider 515 can divide the frequency of an input signal (e.g., an output of the first PLL 510) to produce a signal with a lower frequency, which can be inputted to a second PLL 520. A phase interpolator 530 can adjust, based on a write phase (WPHASE) value, a phase of the signal produced by the second PLL 520 to produce a write clock.

Figure 5B:
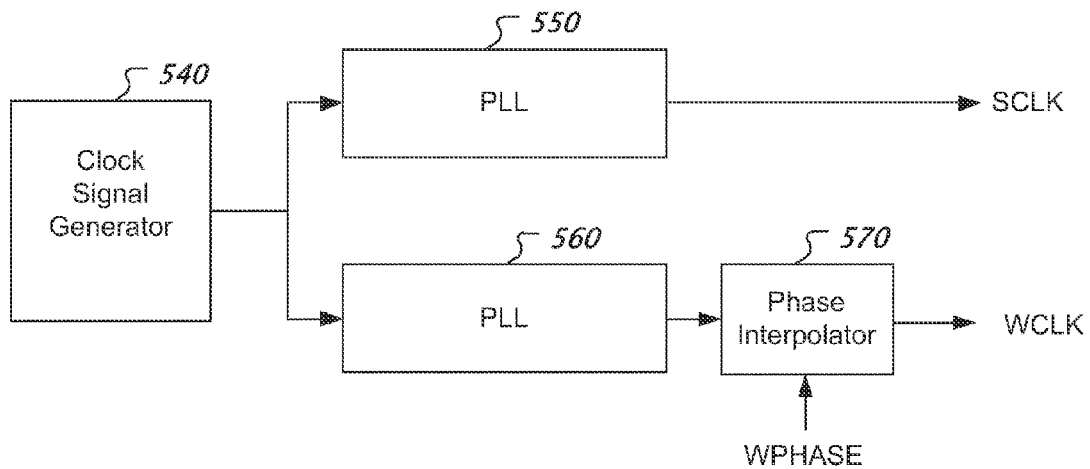

FIG. 5B shows another example of a PLL system. A PLL system can use a clock signal generator 540 to drive a first PLL 550 and a second PLL 560. The system can apply the same frequency offset (in relative terms like PPM or percentage) to the PLLs 550, 560. A phase interpolator 570 can adjust, based on a write phase (WPHASE) value, a phase of the signal produced by the second PLL 560 to produce a write clock.

Figure 6:
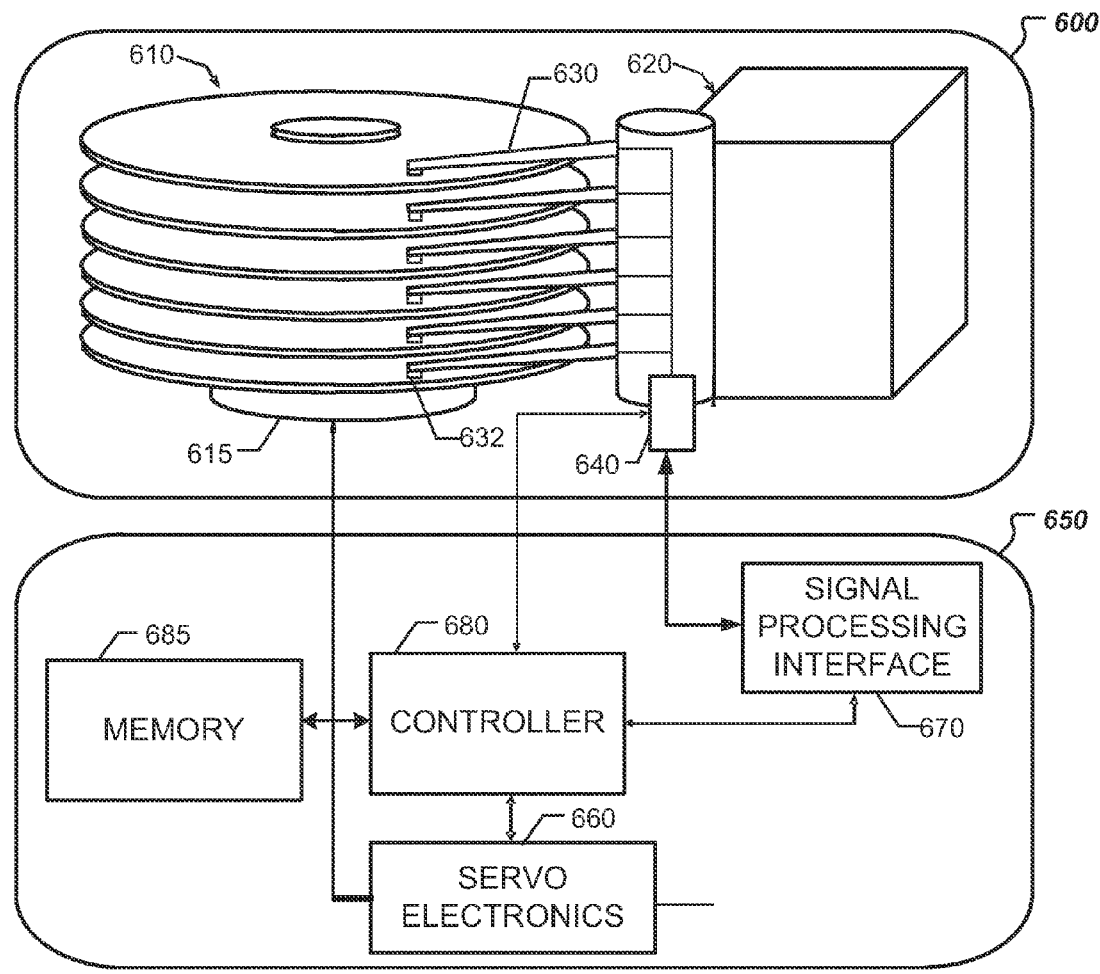
FIG. 6 shows an example of a disk drive system.

FIG. 6 shows an example of a disk drive system. The disk drive includes a head-disk assembly (HDA) 600 and drive electronics 650 (e.g., a printed circuit board assembly (PCBA) with semiconductor devices). The disk drive can include a magnetic recording medium such as one or more BPM based disks 610. A disk 610 can be coated with a magnetically hard material (e.g., a particulate surface or a thin-film surface) and can be written to, or read from, a single side or both sides of each disk. A disk 610 can be coated with a magnetic material with predefined bit positions, e.g., bit cells, to form bit-patterns. In some implementations, a disk 610 can be manufactured to have a configuration such as the one depicted by FIG. 3.

The HDA 600 includes one or more disks 610 mounted on an integrated spindle and motor assembly 615. The integrated spindle and motor assembly 615 includes a spindle motor to rotate the disks 610. The spindle and motor assembly 615 rotates the disk(s) 610 under one or more drive heads 632 that are mechanically coupled with a head assembly 620 in the HDA 600. A drive head 632 can include one or more magnetic transducers. In some implementations, a drive head 632 includes a read head and a write head. The read head and the write head can be located at different portions of the drive head 632. For example, the read head can be physically offset from the write head.

A drive head 632 on an arm 630 can be positioned as needed to read or write data on the disk 610. A motor, such as a voice coil motor (VCM), can be used to position the drive head 632 over a target track on a disk 610. The arm 630 can be a pivoting or sliding arm and can be spring-loaded to maintain a proper flying height for the drive head 632 in any drive orientation. The HDA 600 can include a preamp/writer 640, where head selection and sense current value(s) can be set. The preamp/writer 640 can amplify a read signal before outputting it to signal processing interface 670. Signals between the HDA 600 and drive electronics 650 can be carried through a flexible printed cable.

Drive electronics 650 can include servo electronics 660, signal processing interface 670, and controller 680. The signal processing interface 670 can include a read signal circuit, a servo signal processing circuit, and a write signal circuit. Controller 680 can include processor electronics such as one or more processors to operate the disk drive. The controller 680 can be configured to perform one or more techniques described herein. A controller 680 can communicate with a memory 685 such as a non-volatile memory to retrieve firmware to operate processor electronics. The memory 685 can store data such as synchronization parameters estimated by a technique described herein. In some implementations, controller 680 includes a storage area for computer program code and data.

The controller 680 can be communicatively coupled with an external processor or data bus to receive read/write instructions, receive data to write to disk(s) 610, and transmit data read from one or more disks 610. Controller 680 can direct servo electronics 660 to control mechanical operations, such as head positioning through the head assembly 620 and rotational speed control through the motor assembly 615. In some implementations, the controller 680 can be integrated with the servo electronics 660, signal processing interface 670, or both. The controller 680 can be implemented as one or more integrated circuits (ICs). Drive electronics 650 can also include one or more interfaces, such as a host-bus interface, and memory devices, such as a read only memory (ROM) for use by a microprocessor, and a random access memory (RAM) for use by a hard disk drive controller.

Disk(s) 610 are written with servo information such as servo wedges to aid the controller 680 in adjusting the position of the drive head 632 with respect to a track on the disk(s) 610 and to control the spindle and motor assembly 615. Servo wedge information read by a drive head 632 can be converted from analog signals to digital data by a digital-analog converter, and fed into servo electronics 660. The servo positional information can be used to detect the location of the drive head in relation to a target track or target data sector on a disk 610. Servo electronics 660 can use, for example, target data sectors and servo position information to precisely place a drive head 632 over the target track and data sector on a disk 610, and to continuously maintain head alignment with the target track while writing or reading data to or from one or more identified data sectors.

Drive electronics 650 can include clock circuitry (not shown) that includes a PLL to produce a servo clock signal and a PLL to produce a write clock signal. In some implementations, drive electronics 650 include a control loop calculator 405, timestamp circuit 410, servo detector 415, phase adjustor 425, PLL system 420, write clock sync point generator 430, and a write circuit 435. The controller 680 can operate the control loop calculator 405 and the phase adjustor 425 to make changes to the write clock. In some implementations, the controller 680 implements the control loop calculator 405.

Figure 7:
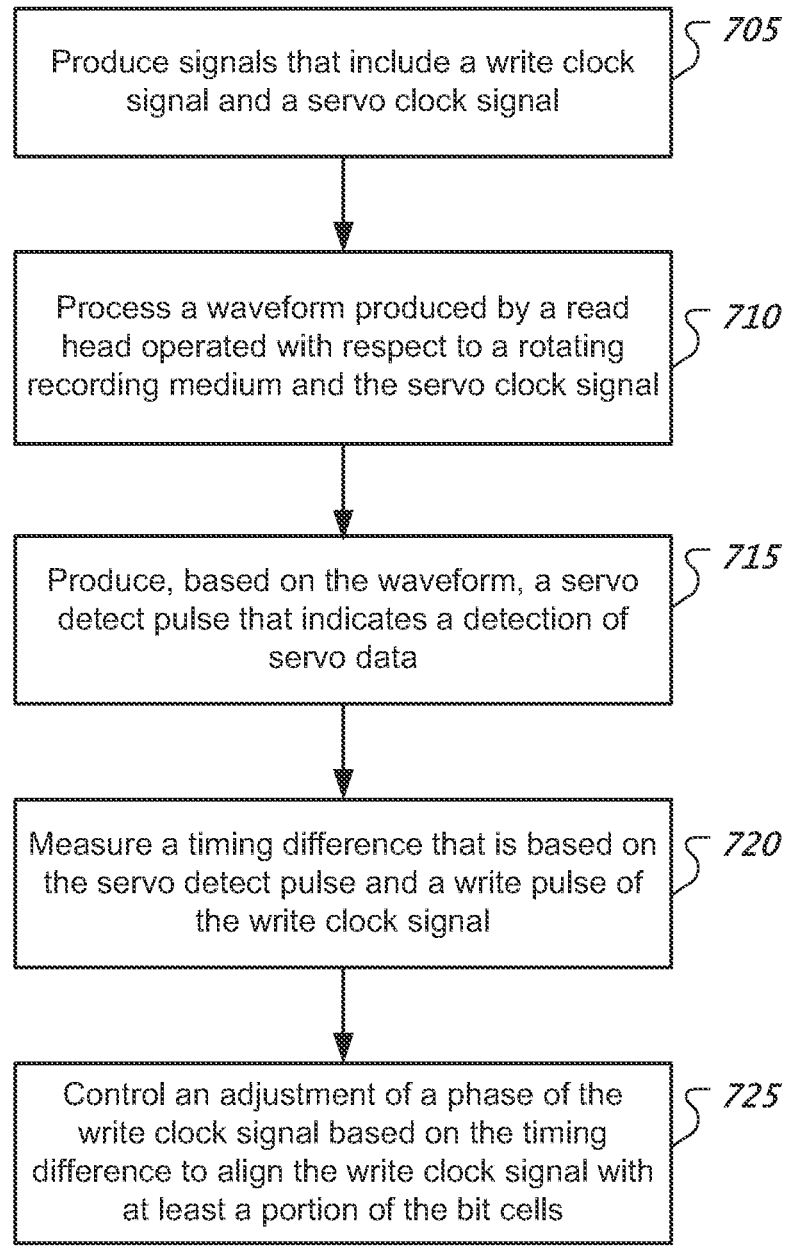
FIG. 7 shows an example of a synchronization process.

FIG. 7 shows an example of a synchronization process. A disk drive can synchronize a write clock for writing to a BPM based disk. The disk drive can synchronize the write clock for each data sector to provide the timing synchronization required for that data sector. At 705, a synchronization process includes producing signals that include a write clock signal and a servo clock signal. In some implementations, a PLL system produces the write clock signal and the servo clock signal.

At 710, the synchronization process includes processing a waveform produced by a read head operated with respect to a rotating recording medium and the servo clock signal. The medium can include magnetic bit cells arranged on tracks. Processing the waveform can include matching a predetermined servo data pattern to the waveform to detect a SSM. At 715, the process includes producing, based on the waveform, a servo detect pulse that indicates a detection of servo data such as a SSM.

At 720, the synchronization process includes measuring a timing difference that is based on the servo detect pulse and a write pulse of the write clock signal. Measuring a timing difference can include using a timestamp corresponding to the servo detect pulse and a timestamp corresponding to the write pulse. At 725, the process includes controlling an adjustment of a phase of the write clock signal based on the timing difference to align the write clock signal with at least a portion of the bit cells. Controlling an adjustment of a phase of the write clock signal can include providing a phase interpolator with a phase value that is based on the timing difference. In some implementations, the synchronization process operates a servo clock that is locked on to servo data of a first track. Based on a detection of servo data on the first track, a disk drive can synchronize a write clock to the servo clock to write data to the second track. In some implementations, the synchronization process reads servo data from a track, synchronizes based on the servo data, and writes to the same track.

Figure 8:
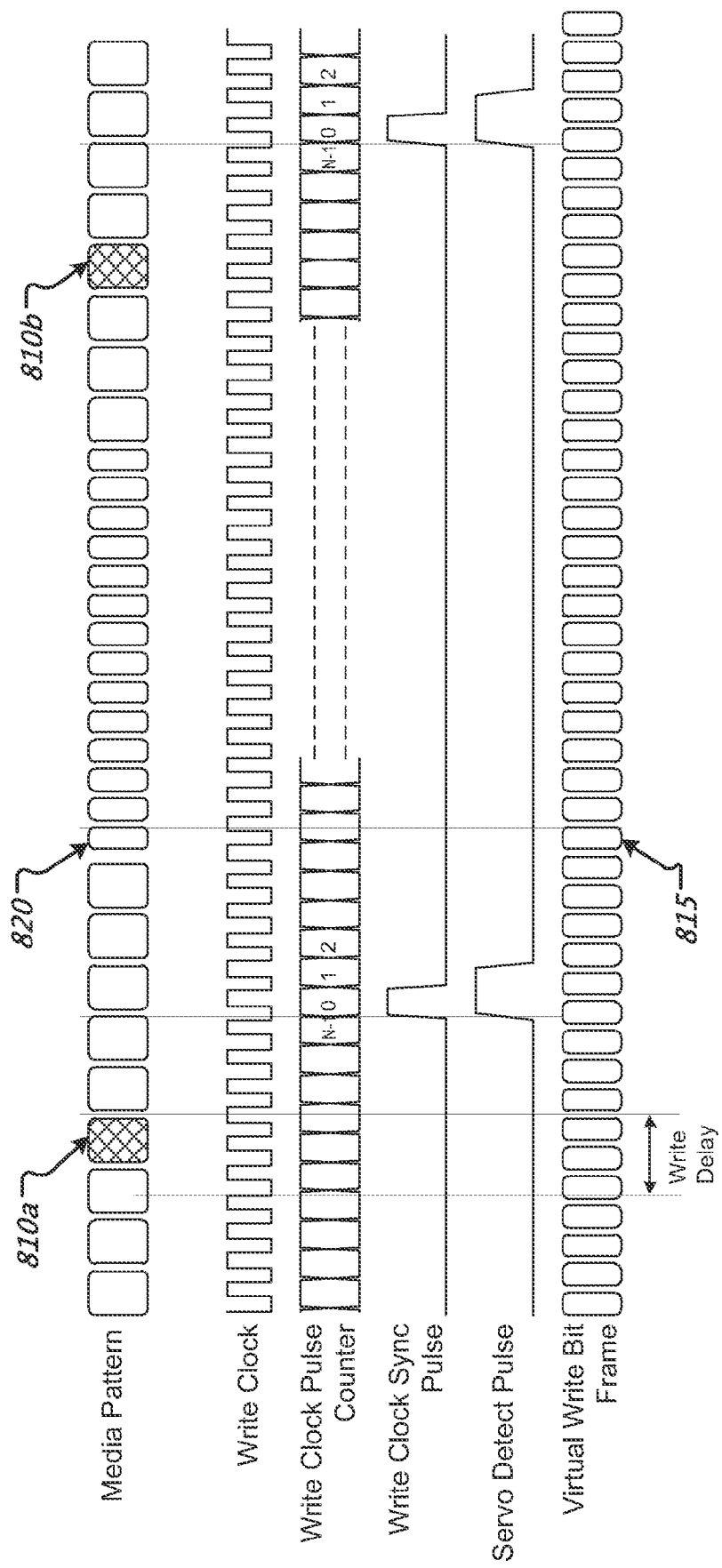
FIG. 8 shows a timing diagram example of signals associated with a synchronization process.

FIG. 8 shows a timing diagram example of signals associated with a synchronization process. In this example, a disk drive performs a synchronization process based on timing of a servo detect pulse and a write clock sync pulse. The disk drive produces a servo detect pulse based on a detection of servo data (e.g., a detection of a SSM 810*a*, 810*b*) in a read head signal. The write clock sync pulse triggers a synchronization of a write clock. The disk drive can adjust a write clock with respect to a virtual write bit frame. In some implementations, a virtual write bit frame includes a continuous sequence of virtual bit cells 815 that can be aligned with one or more physical bit cells 820 of a track. In some implementations, a disk drive can use a virtual write bit frame for writing to one or more physical bit cells.

The disk drive can use a write clock pulse counter (WCPC) that counts write clock pulses to synchronize one or more clock signals. In some contexts, the WCPC is referred to as a W2W counter. A pulse of the write clock causes the WCPC to be incremented modulo a predetermined value N. The WCPC counts from 0 to N−1, wrapping around back to 0. The value of N can be based on one or more characteristics of a disk's bit media pattern. In some implementations, N is the number of data bit cells that fit into an area that is equivalent to a distance from the end of a SSM 810*a* to the end of the next SSM 810*b*. In some implementations, a write clock period can be based on a duration of N data bit cells. Based on a counter wraparound, the disk drive produces a write clock sync pulse, which can trigger a write clock synchronization. Other techniques for producing a write clock sync pulse are possible.

Timestamps of pulses can be used for synchronization. A disk drive can calculate a phase offset based on timestamps corresponding to a servo detect pulse and a write clock sync pulse, respectfully. In some implementations, a disk drive includes a timestamp circuit that timestamps the falling edge of the write clock sync pulse. In some implementations, a disk drive includes a timestamp circuit that timestamps the falling edge of the servo detect pulse. In some implementations, calculating a phase offset includes using a write delay value.

The disk drive can include a servo detector that produces a servo detect pulse such as a SSM detect pulse. There can be a fixed latency from the time when a SSM is detected and the generation of a SSM detect pulse. In some implementations, the disk drive uses a midpoint of the rising edge of a SSM detect pulse as a synchronization point for a write clock. In some implementations, the disk drive uses a midpoint of the falling edge of a SSM detect pulse as a synchronization point for a write clock.

Figure 9:
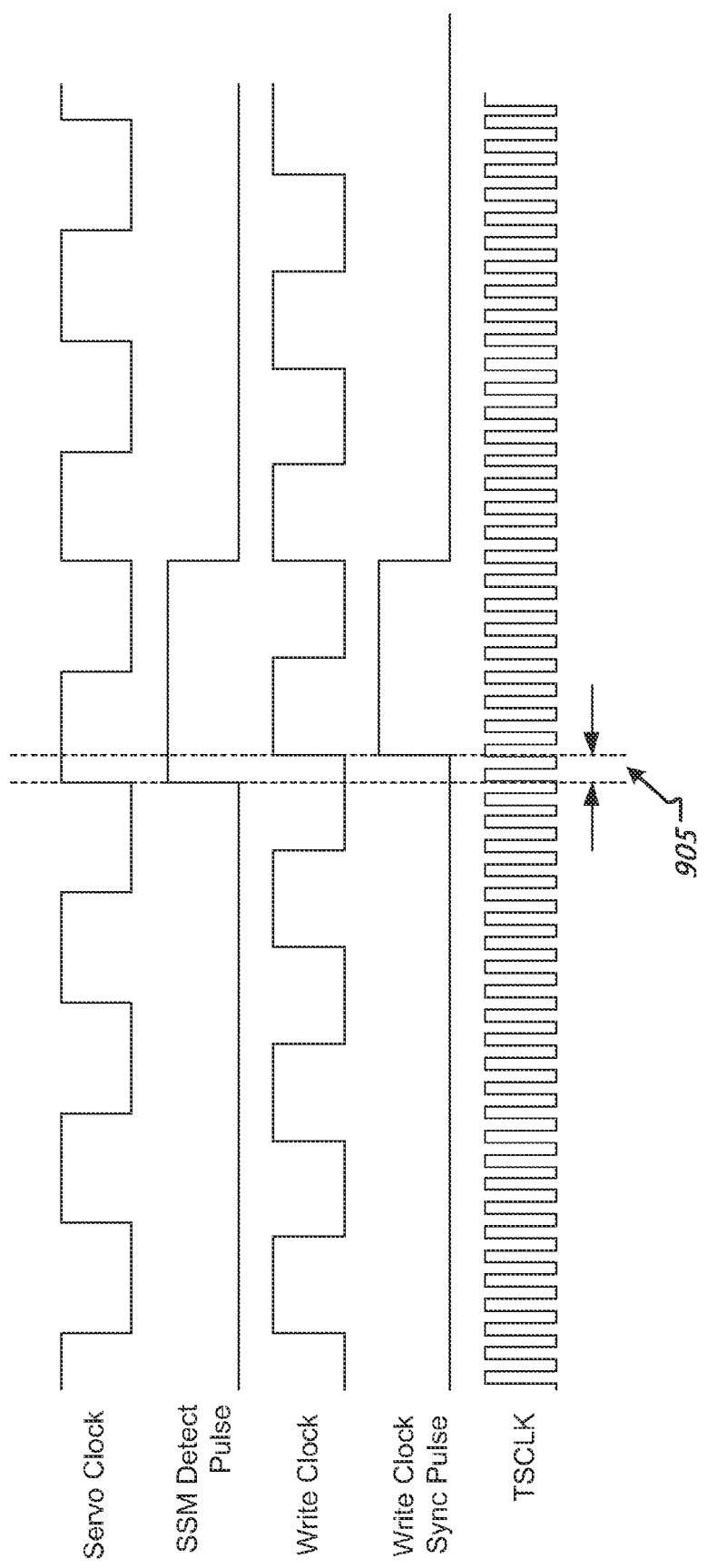
FIG. 9 shows an example of measuring a phase offset with respect to a timestamp clock.

FIG. 9 shows an example of measuring a phase offset with respect to a timestamp clock. A timestamp circuit can use a high-speed clock such as timestamp clock (TSCLK) to measure a phase offset 905 between a SSM detect pulse and a write clock pulse. In this example, the phase offset 905 is depicted as one period of the TSCLK. In some implementations, rather than using a TSCLK signal, a technique that relies on preambles and training sequences can be used to measure the phase offset between a SSM detect pulse and a write clock pulse.

Using the phase offset 905, the disk drive can perform synchronization by aligning a signal edge of a write clock to a signal edge of a servo clock that is synchronized to a media signal. The disk drive can use a SSM detect pulse as a reference point on the servo clock. The difference between the signal edge of the SSM detect pulse and the signal edge of a write clock sync pulse can be measured by a controller.

Figure 10:
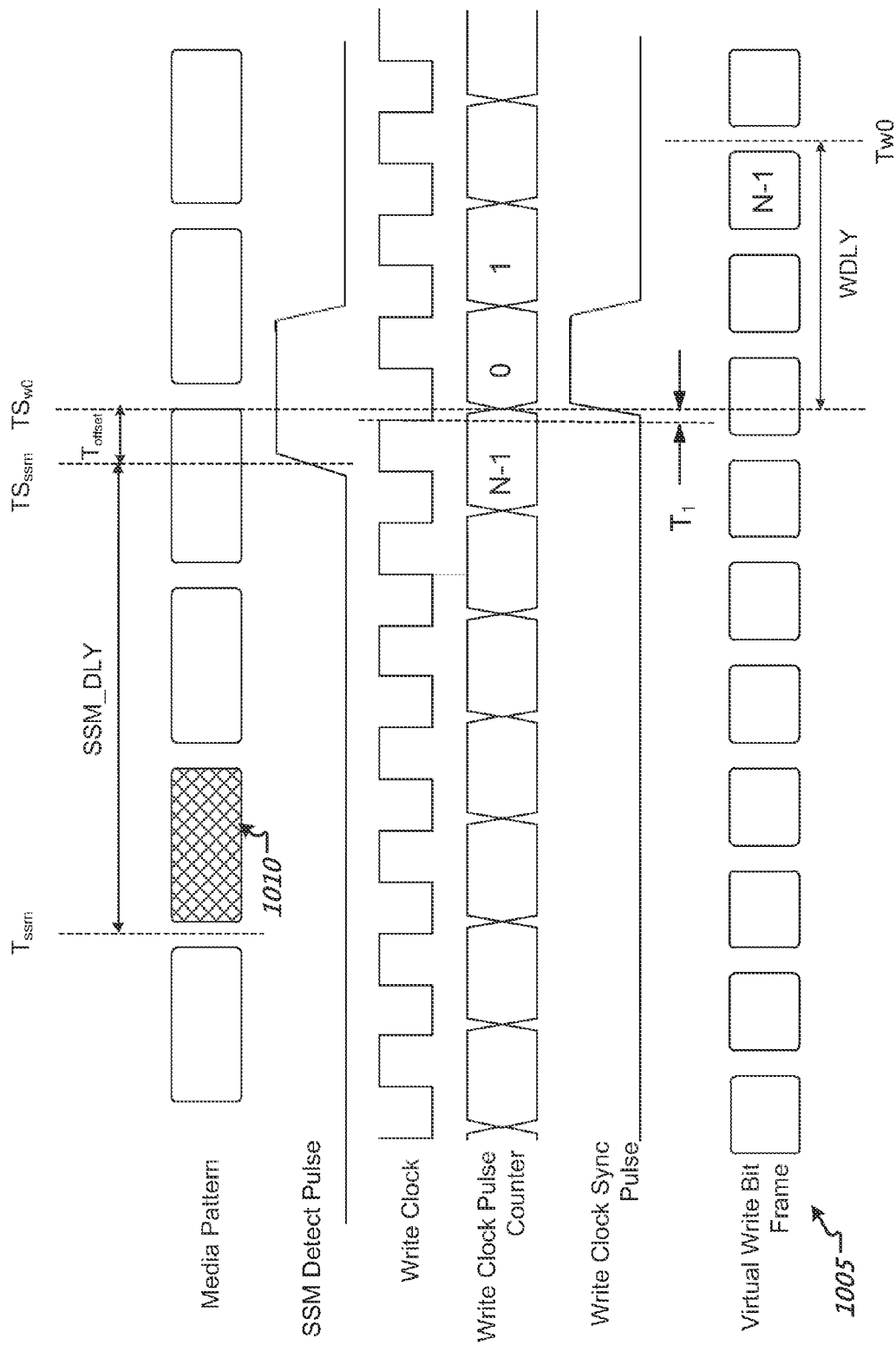
FIG. 10 shows another timing diagram example of signals associated with a synchronization process.

FIG. 10 shows another timing diagram example of signals associated with a synchronization process. A controller can use a virtual write bit frame 1005 to write to one or more bit cells of a BPM disk. A layout of a virtual write bit frame 1005 is based on a physical layout of bit cells of a BPM disk. In contrast to the physical layout, the virtual write bit frame 1005 includes additional bit cells in lieu of a servo frame. The controller can calculate an offset based on a virtual write bit K and a SSM 1010. The controller can use the offset in a write clock synchronization process. In this example, the write clock pulse counter wraps-around after the K-th value.

The write clock synchronization process is based on timing values including a start time of a SSM 1010 ($T_{ssm}$), a timestamp associated with the SSM 1010 ($TS_{ssm}$), a write time ($T_{w0}$), a timestamp associated with the write time ($TS_{w0}$), and a delay time ($T_1$). The controller can determine a write phase delay (WDLY) and a SSM delay (SSM_DLY). The write phase delay can be calibrated by a write calibration process. The SSM delay is based on a delay between a read head's passage over a SSM 1010 and when a SSM detect pulse is generated. The controller can use the equations:

$$T_{w0} = T_{ssm} + SSM\_DLY + T_{offset} + WDLY$$

$$T_{offset} = (T_{w0} - WDLY) - T_{ssm} + SSM\_DLY)$$

$$T_{offset} = TS_{w0} - TS_{ssm}$$

to determine a timing offset value ($T_{offset}$).

In some implementations, a controller can include a control loop calculator 405. A control loop calculator 405 can use an error function E(n) and a phase function PH(n) to adjust a write clock phase. The control loop calculator 405 can use $$E(n) = TS_{w0}(n) - TS_{ssm}(n) + T_{offset}$$

to compute values for the error function E(n). In some implementations, a timestamp circuit 410 detects $TS_{ssm}$ and $TS_{w0}$ based on a detected SSM pulse, a write clock sync pulse, and a timestamp clock (TSCLK). In some implementations, a timestamp circuit 410 uses a timing offset value $T_{offset}$ that is based on a disk format. In some implementations, $T_{offset}$ is determined based on the physical positions of the SSM and the bit cells to write, which is converted into a time difference between the detection of the SSM and the write operation. In some implementations, $T_{offset}$ is determined based on a calibration process to find a $T_{offset}$ value that minimizes write errors. A calibration process can include setting $T_{offset}$ to zero, writing data, reading that data back, measuring a bit error rate, increasing $T_{offset}$ by a fixed value, and repeating if required.

In some implementations, a control loop calculator 405 can use $$PH(n) = PH(n-1) - \alpha \times E(n) + \sum_{i=0}^{n} -\beta \times E(i)$$

to compute values for the phase function PH(k), where α and β are parameters that can be determined or retrieved by a controller. A phase adjustor 425 can gradually change a write phase (WPHASE) to match a phase function PH(n) value.

If an error function E(k) value is greater than a target value, then writing in the next sector may not be optimal and should be avoided. In this case, the control loop calculator 405 can assert a write error signal (WERR) to prevent a write to the disk. In some implementations, a write circuit 435 receives the write error signal. In some implementations, a main controller receives the write error signal.

Figure 11:
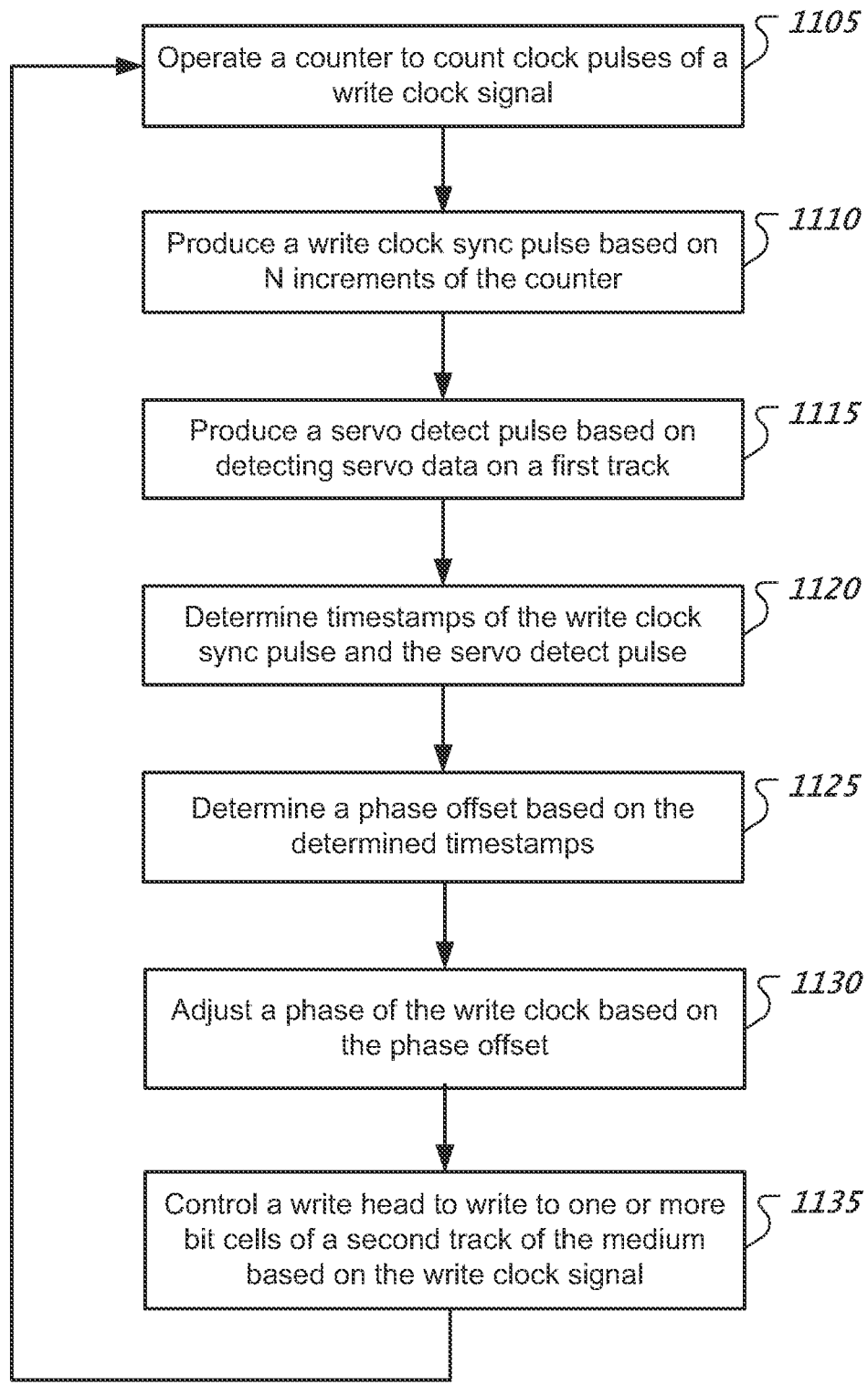
FIG. 11 shows an example of a write clock rephase process.

FIG. 11 shows an example of a write clock rephase process. A disk drive can repeatedly rephase write clock for writing to respective data sectors of a track. A data sector can include multiple data bit cells. At 1105, a write clock rephase process operates a counter to count clock pulses of a write clock signal. At 1110, the process produces a write clock sync pulse based on N increments of the counter. In some implementations, N represents a number of bit cells in an area defined by a distance, on a track of the medium, from a first servo sync mark to a second servo sync mark. At 1115, the process produces a servo detect pulse based on detecting servo data on a first track.

At 1120, the write clock rephase process determines timestamps of the write clock sync pulse and the servo detect pulse. At 1125, the process determines a phase offset based on the determined timestamps. At 1130, the process adjusts a phase of the write clock based on the phase offset. At 1135, the process controls a write head to write to one or more bit cells of a second track of the medium based on the write clock signal. To write to a different region of the disk, such as a subsequent sector of the second track, the process can be repeated to rephase the write clock.

In some implementations, a BPM disk can include servo wedges with phase synchronization marks. A disk drive process can include reading the phase synchronization marks, demodulating angle information, and re-phasing a write clock accordingly.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
   clock circuitry configured to produce a write clock signal and a servo clock signal;
   circuitry configured to process a waveform produced by a read head operated with respect to a recording medium, the medium comprising magnetic data positions arranged on tracks, the tracks comprising a first track and a second track;
   circuitry configured to produce, based on the waveform, a servo detect pulse that indicates a detection of servo data on the first track;
   circuitry configured to measure a timing difference that is based on the servo detect pulse and a write pulse of the write clock signal;
   circuitry configured to control an adjustment of a phase of the write clock signal based on the timing difference to align the write clock signal with at least a portion of the data positions; and
   circuitry configured to control a write head to write to one or more data positions of the second track based on the write clock signal while the servo clock signal is servo locked on the first track.

2. The apparatus of claim 1, wherein the read head and write head are physically offset from each other, wherein the first track and the second track have different radii, and wherein the adjustment is based on an inter-track phase offset value.

3. The apparatus of claim 1, further comprising:
   circuitry configured to prevent the write head from writing to the one or more data positions of the second track when the timing difference exceeds a threshold.

4. The apparatus of claim 1, further comprising:
   circuitry configured to operate a counter to count clock pulses of the write clock signal; and
   circuitry configured to produce a write clock sync pulse based on N increments of the counter, wherein N represents a number of data positions in an area defined by a distance, on a track of the medium, from a first servo sync mark to a second servo sync mark,
   wherein the circuitry configured to measure the timing difference is responsive to the write clock sync pulse.

5. The apparatus of claim 4, further comprising:
   circuitry configured to determine timestamps in response to the write clock sync pulse and the servo detect pulse, the timestamps comprising a timestamp of the servo detect pulse and a timestamp of the write pulse,
   wherein the circuitry configured to measure the timing difference is responsive to the determined timestamps.

6. The apparatus of claim 1, wherein the clock circuitry comprises:
   a first phase-locked-loop circuit to produce the servo clock signal;
   a second phase-locked-loop circuit to produce the write clock signal; and
   a phase interpolator to adjust the phase of the write clock signal.

7. The apparatus of claim 1, wherein the clock circuitry is configured to use a single voltage controlled oscillator to produce the write clock signal and a servo clock signal, and wherein the clock circuitry comprises:
   a phase-locked-loop circuit, that includes the voltage controlled oscillator, to produce a source clock signal; and
   a frequency divider to produce a frequency adjusted version of the source clock signal.

8. A system comprising:
   a recording medium, the medium comprising magnetic data positions arranged on tracks, the tracks comprising a first track and a second track;
   clock circuitry configured to produce a write clock signal and a servo clock signal;
   a read head, operated with respect to the medium, to produce a waveform;
   a servo detector configured to produce, based on the waveform, a servo detect pulse that indicates a detection of servo data on the first track;
   a timestamp circuit configured to measure a timing difference that is based on the servo detect pulse and a write pulse of the write clock signal;
   a control loop calculator configured to control an adjustment of a phase of the write clock signal based on the timing difference to align the write clock signal with at least a portion of the data positions;

a write head configured to write to the medium; and circuitry configured to control the write head to write to one or more data positions of the second track based on the write clock signal while the servo clock signal is servo locked on the first track.

9. The system of claim 8, further comprising:

a head structure that comprises the read head and the write head, wherein the read head and write head are physically offset from each other; and a servo configured to position the head structure.

10. The system of claim 8, further comprising:

circuitry to prevent the write head from writing to the one or more data positions of the second track when the timing difference exceeds a threshold.

11. The system of claim 8, further comprising:

circuitry configured to operate a counter to count clock pulses of the write clock signal; and circuitry configured to produce a write clock sync pulse based on N increments of the counter, wherein N represents a number of data positions in an area defined by a distance, on a track of the medium, from a first servo sync mark to a second servo sync mark, wherein the timestamp circuit is responsive to the write clock sync pulse.

12. The system of claim 11, further comprising:

circuitry configured to determine timestamps in response to the write clock sync pulse and the servo detect pulse, the timestamps comprising a timestamp of the servo detect pulse and a timestamp of the write pulse, wherein the timestamp circuit is responsive to the determined timestamps.

13. The system of claim 8, wherein the clock circuitry comprises:

a first phase-locked-loop circuit to produce the servo clock signal;

a second phase-locked-loop circuit to produce the write clock signal; and a phase interpolator to adjust the phase of the write clock signal.

14. The system of claim 8, wherein the clock circuitry is configured to use a single voltage controlled oscillator to produce the write clock signal and the servo clock signal, and wherein the clock circuitry comprises:

a phase-locked-loop circuit, that includes the voltage controlled oscillator, to produce a source clock signal; and a frequency divider to produce a frequency adjusted version of the source clock signal.

15. A method comprising:

producing signals that include a write clock signal and a servo clock signal;

processing a waveform produced by a read head operated with respect to a recording medium, the medium comprising magnetic data positions arranged on tracks, the tracks comprising a first track and a second track;

producing, based on the waveform, a servo detect pulse that indicates a detection of servo data on the first track;

measuring a timing difference that is based on the servo detect pulse and a write pulse of the write clock signal;

controlling an adjustment of a phase of the write clock signal based on the timing difference to align the write clock signal with at least a portion of the data positions; and controlling a write head to write to one or more data positions of the second track based on the write clock signal while the servo clock signal is servo locked on the first track.

16. The method of claim 15, wherein the read head and write head are physically offset from each other, and wherein the first track and the second track have different radii, and wherein the adjustment is based on an inter-track phase offset value.

17. The method of claim 15, further comprising:

preventing the write head from writing to the one or more data positions of the second track when the timing difference exceeds a threshold.

18. The method of claim 15, further comprising:

operating a counter to count clock pulses of the write clock signal; and producing a write clock sync pulse based on N increments of the counter, wherein N represents a number of data positions in an area defined by a distance, on a track of the medium, from a first servo sync mark to a second servo sync mark, wherein measuring the timing difference is responsive to the write clock sync pulse.

19. The method of claim 18, further comprising:

determining timestamps in response to the write clock sync pulse and the servo detect pulse, the timestamps comprising a timestamp of the servo detect pulse and a timestamp of the write pulse, wherein measuring the timing difference comprising calculating a difference based on the determined timestamps.

20. The method of claim 15, wherein controlling the adjustment of the phase of the write clock signal comprises providing a control signal to a phase interpolator, wherein the control signal is responsive to the adjustment.

* * * * *